Nov. 28, 1939.   J. B. CHIPMAN   2,181,356
LUMBER PILING RACK
Filed June 30, 1938   3 Sheets-Sheet 1

INVENTOR
JOHN B. CHIPMAN
BY
ATTORNEY

Nov. 28, 1939.  J. B. CHIPMAN  2,181,356
LUMBER PILING RACK
Filed June 30, 1938  3 Sheets-Sheet 3

INVENTOR
JOHN B. CHIPMAN
BY J. S. Cook
ATTORNEY

Patented Nov. 28, 1939

2,181,356

UNITED STATES PATENT OFFICE 2,181,356

LUMBER PILING RACK

John B. Chipman, Webster Groves, Mo.

Application June 30, 1938, Serial No. 216,691

5 Claims. (Cl. 214—8)

My invention relates to a new method of piling lumber and a rack for holding the same, and has for its primary object to keep such lumber in said piles from "crooking", splitting, bowing, checking, or "cupping". Another object is to provide a water shed to keep moisture, for instance, rain or snow, from penetrating into piles of lumber piled according to my new method. A still further object is to provide offset, longitudinal joints between the several contacting layers of lumber in the piles, to prevent moisture passing through such joints and causing deterioration of the individual units in such piles. That is to say, the longitudinal joints between the individual units in one row are staggered with relation to the joints in the contacting rows, so that moisture does not have a direct channel through which to pass from row to row.

In any method of piling lumber heretofore employed, so far as I am aware, serious losses have occurred which I have found by experience with my method of piling can be virtually eliminated. By my method of piling lumber any piece or pieces that may be crooked, bowed, or "cupped" will be straightened after a short period when incorporated in one of my piles. When placed in a pile laid according to my new method, lumber does not deteriorate, but, on the contrary, tends to improve while the lumber remains in such a pile.

My new rack which holds the lumber piled in accordance with my new method is so constructed as to permit of the ready and convenient insertion and removal of the individual pieces of lumber, and is light and sturdy and durable and efficient in structure, and not expensive to construct. My new rack securely holds the piled lumber against slippage sideways of the individual pieces or rows.

In many years of experience with piled lumber I have found as high as a 20 percent loss due to deterioration of the individual planks or pieces caused by moisture entering into the body of the piled lumber and causing "crooking", splitting, bowing, checking, or cupping, however carefully said lumber had been piled. Every lumber dealer is familiar with this fact and yet until I discovered my new method of piling and my new rack for holding the same, no successful method had been devised for overcoming such loss. By my new method I have reduced the loss from the foregoing causes to a fraction of 1 percent.

Figure 1:
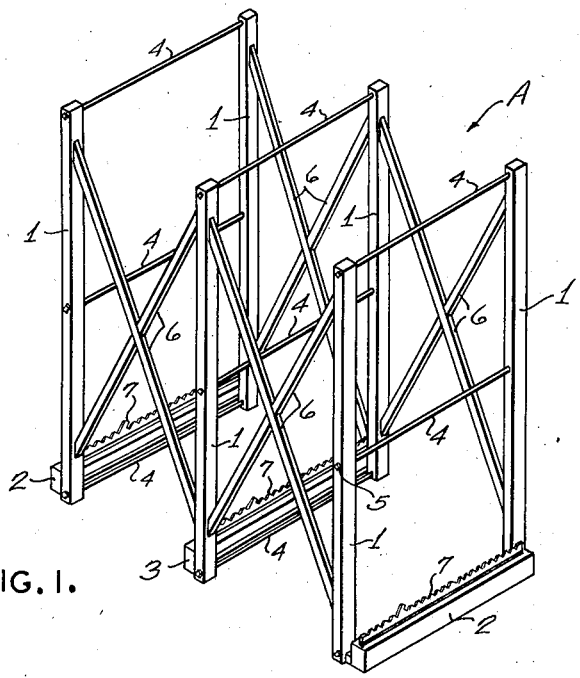
Fig. 1 is a perspective view of my new rack.
Figure 2:
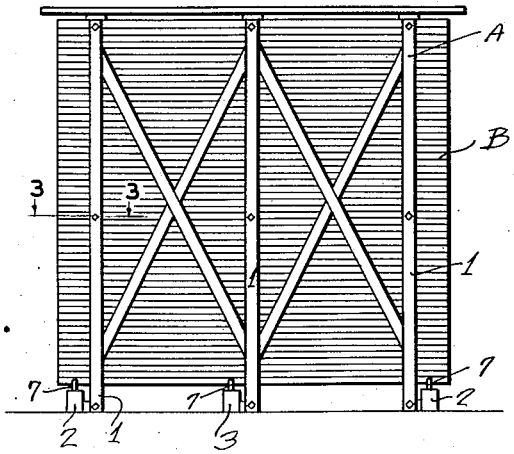
Fig. 2 is a side elevation of the same.

In the drawings, A designates a frame constructed to receive the stack of lumber B, which is comprised of a number of individual pieces or planks of lumber. I will first describe the frame. I place a series of posts 1 extending upwardly from and secured to end members 2 and of sufficient strength to withstand the weight of the piled lumber thereagainst. Preferably I place such an upright post 1 on each transverse member 2 and 3, one at each end of such member, and secured thereto. At appropriate midway and end points I join each upright post 1 to its opposite companion post in a transverse line by a series of rods 4, which at their ends are passed through a hole in each post 1 and secured in place by nuts 5 to hold said rods in position in said posts. Preferably the upright posts 1 are connected together by the brace pieces 6 extending diagonally from the top to the bottom of said posts, as clearly shown in Fig. 1. By such an arrangement I secure a very stable yet light and compact frame for lumber piled according to my hereinafter described method.

On each transverse foundation member 2 and 3 I preferably place centrally of the length thereof notched members 7 or 7' with the notched portion at the top. To the bottom of these members 7 or 7' I attach a strengthening member 8, whereby I prevent any tendency of the members 7 or 7' to sag or get out of line.

Figure 4:
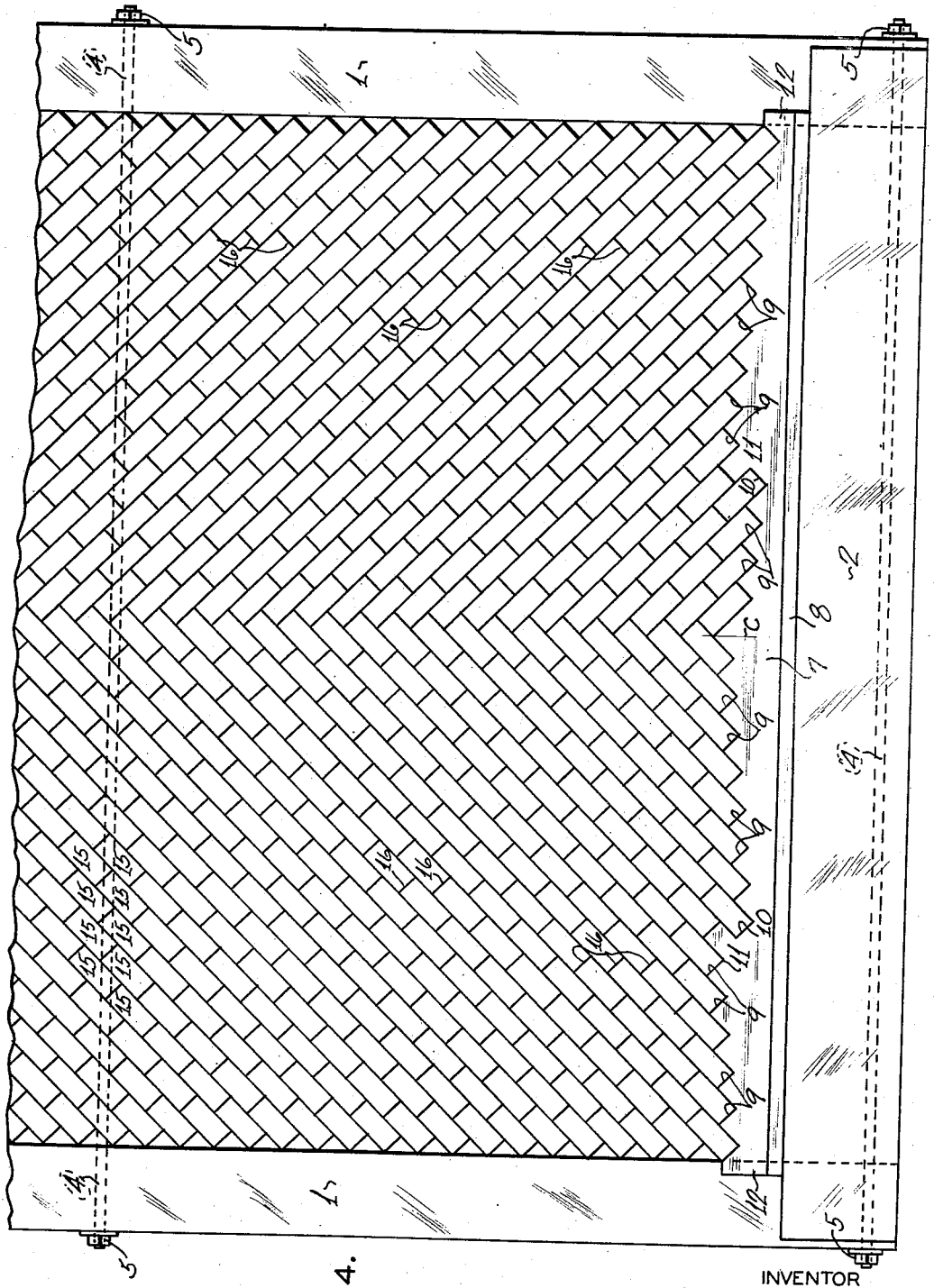
Fig. 4 is an enlarged, partial end view of my new rack with lumber of approximately 2 x 4 inch pieces piled according to my new method.
Figure 5:
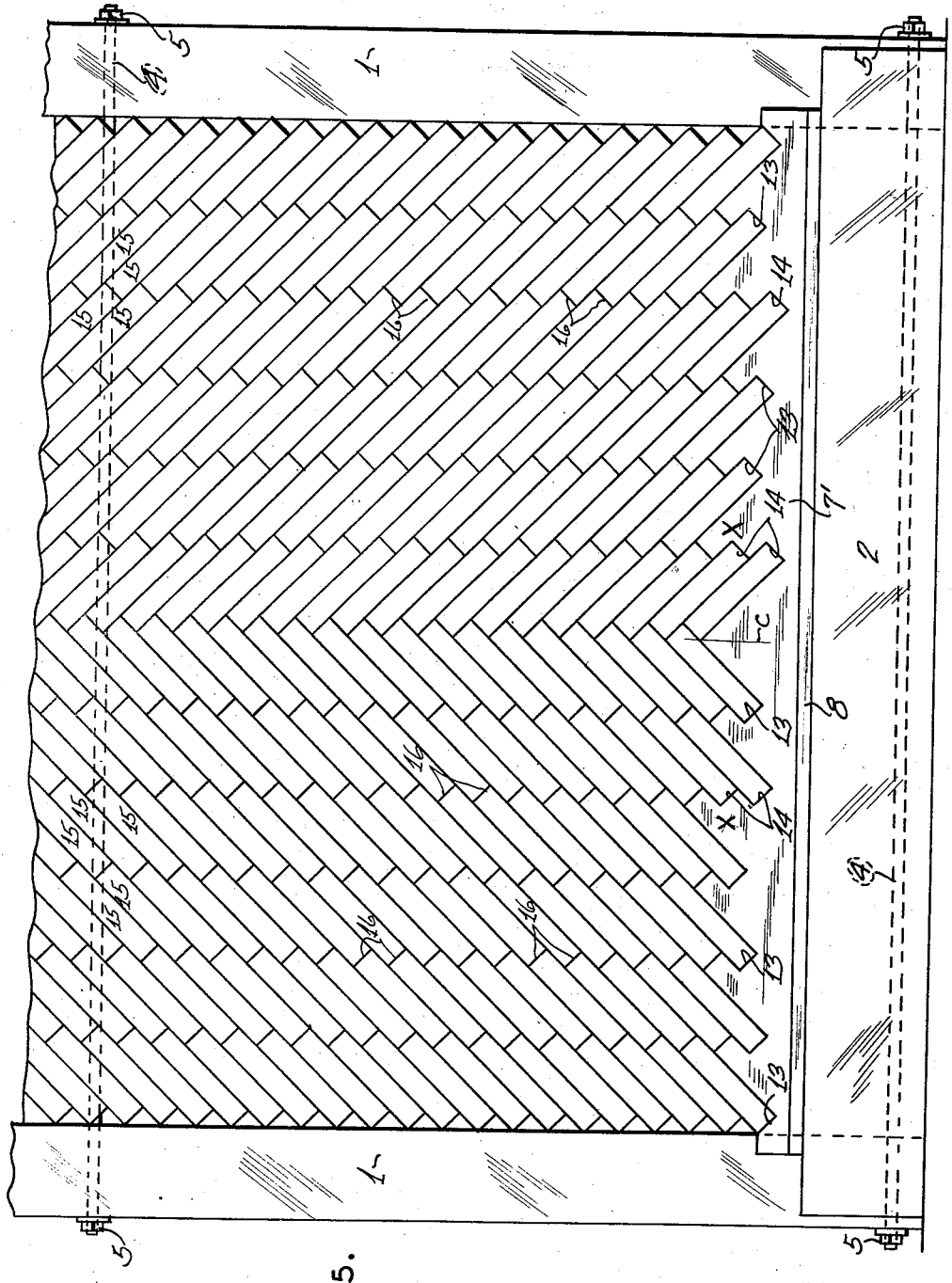
Fig. 5 is a view similar to Fig. 4, showing lumber of approximately 2 x 8 inches piled according to my new method.

I have found it very important to construct the members 7 and 7' as shown in Figs. 4 and 5 to accommodate different widths of lumber, such as shown, for example, in said figures. I will first describe the member 7 as shown in Fig. 4. Starting at the center line C of said member 7, I form a series of shallow, V-shaped notches 9 at the left and right of the center line C. I will describe the left-hand notches, the right-hand notches being identical. These notches 9 progress leftwardly in a downwardly descending line to a point substantially midway the length of the member 7 from said center line C to the left end of said member. At the point indicated by the numeral 10 I form a rectangular-shaped notch, and then at 11 I start another series of V-shaped notches extending in a downwardly descending line to a point adjacent the end 12 of the member 7. This same condition prevails on the side of the member 7 to the right of the center line C. The individual pieces of lumber shown in Fig. 4 are the usual 2 x 4 inches in the rough, but measure actually when finished 1⅝ x 3⅝ inches.

I will now describe the member 7' shown in Fig. 5. Starting at the center line C, I provide notches 13 angularly placed and proceeding both left and right from said center line C in a progressively descending line toward the outer edges of the member 7', as shown in Fig. 5. At the point indicated by X I provide a double notch 14 so as to secure the proper center line registration of the individual piles of lumber as clearly appears in said figure. The individual pieces of lumber shown in Fig. 5 are in the rough 2 x 8 inches, but actually 1⅝ x 7½ inches when finished and incorporated in the pile.

Figure 3:
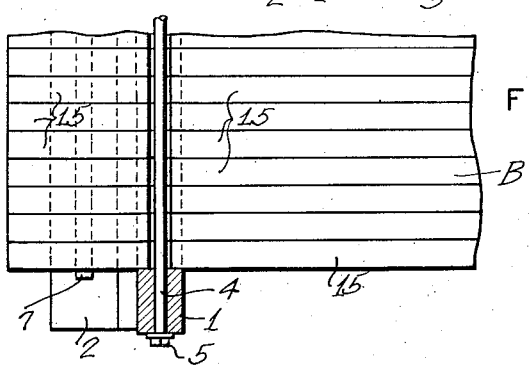
Fig. 3 is a horizontal section taken on line 3—3, Fig. 2.

It will be noted by reference to Figs. 4 and 5 that due to the foundation members 7 and 7' a symmetrical pile of lumber is secured. It is important that in the different sizes of lumber the foundation members upon which the piles of lumber are started must be figured out and the notches in said members must be such as to permit the symmetrical piling of such lumber, so that proper registration at the center line may be secured. I have illustrated the notched members 7 and 7' for two different sizes of lumber as illustrative of this feature.

Where the rods 4 traverse the pile I prefer to have lengths of lumber cut to fill in the spaces at the ends and central portions between said rods, as shown at 15 in Fig. 3. It will be noted that by my method of piling I secure a very compact pile and one in which the longitudinal joints 16 between the individual pieces in each pile is offset from the joints 16 in the upper and lower contacting pile of lumber. By this method I prevent any moisture working its way through the pile of lumber. As the individual boards are in close contact, each layer with each other layer, it is apparent that no moisture may enter between the ends of such layers. I can, if desired, place a layer of tarpaulin over the top of the completed pile of lumber to protect the top layer of the pile from the weather.

It will be noted that the outer side edge of the outermost piece of lumber abuts against the inner side of the upright posts 1. By this arrangement the individual layers are securely held in place against possible displacement. After a short time in a pile placed in accordance with my herein disclosed method, each piece of lumber is straight and no checking, splitting, or cracking takes place, and such lumber is accordingly in prime condition for use.

I claim:

1. A rack for holding piled pieces of lumber comprising a set of transverse foundation members, a series of vertical posts associated with said members, means for transversely connecting said posts near the upper ends thereof, said rack adapted to receive a series of pieces of lumber angularly piled with respect to its width so that one corner of each of said outermost pieces of lumber abuts against one side of said posts, and a notched member having a plurality of notches extending from a center line, said notches having long and short sides, the long sides of the notches sloping in opposite directions from each other and toward the center line, said member being placed on the end transverse members to cause said pieces of lumber to receive the desired piling angle transversely of the individual pieces of said lumber.

2. A rack for holding piled pieces of lumber comprising a set of transverse foundation members, a series of vertical posts associated with said members, rods for connecting said posts near the upper ends thereof, said rack adapted to receive a series of pieces of lumber angularly piled with respect to its width so that one corner of each of said outermost pieces of lumber abuts against one side of said posts, and a notched member, the notches of which extend in opposite angular directions from the center, placed on the end transverse members to cause said pieces of lumber to receive the desired piling angle transversely of the individual pieces of said lumber.

3. A rack for holding piled pieces of lumber comprising a set of transverse foundation members, said rack adapted to receive a series of vertical posts associated with said members, rods for connecting said posts midway of the height of said posts as well as near the upper ends of said posts, a series of pieces of lumber angularly piled with respect to its width so that one corner of each of said outermost pieces of lumber abuts against one side of said posts, and a notched member placed on the end transverse members having a plurality of oppositely sloping notches at each side of its center line to cause said pieces of lumber to receive the desired piling angle transversely of the individual pieces of said lumber.

4. A rack for holding piled pieces of lumber comprising a set of transverse foundation members, a series of vertical posts associated with said members, means for transversely connecting said posts near the upper ends thereof, a series of pieces of lumber angularly piled with respect to its width so that one corner of each of said outermost pieces of lumber abuts against one side of said posts, and a notched member placed on the end transverse members to cause said pieces of lumber to receive the desired piling angle transversely of the individual pieces of said lumber, a double notch being provided midway the length of said notched block, said notches being downwardly inclined from the center line of said block toward the outer ends thereof.

5. A rack for holding piled pieces of lumber comprising a plurality of transverse foundation members, a series of vertical posts associated with said members, means for connecting the upper ends of said posts, and notched members placed on the end transverse members, the notches being of U-shape and extending from left to right at each side of the center line of said members, and said notches being inclined inwardly toward the center line.

JOHN B. CHIPMAN.